Oct. 11, 1932.    W. W. WILLIAMS    1,882,466
ELECTRICALLY OPERATED MOTOR AND CONTROLLING MEANS THEREFOR
Filed Dec. 23, 1929
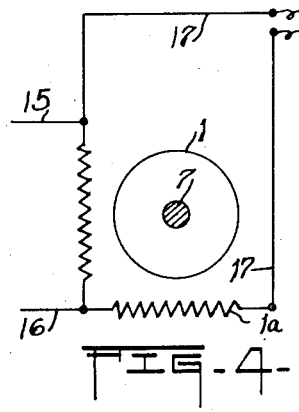
FIG-4-
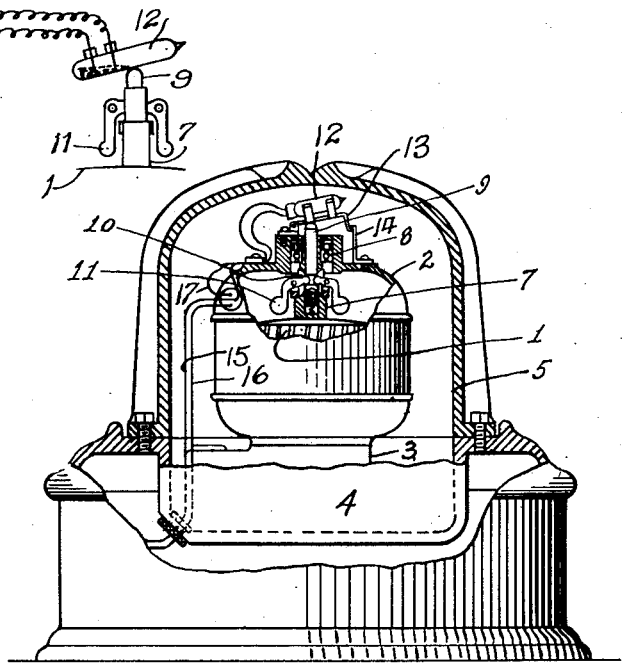
FIG-1-
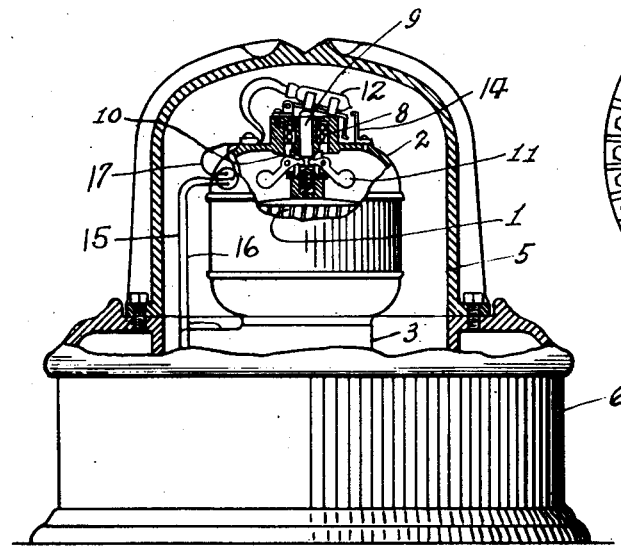
FIG-2-
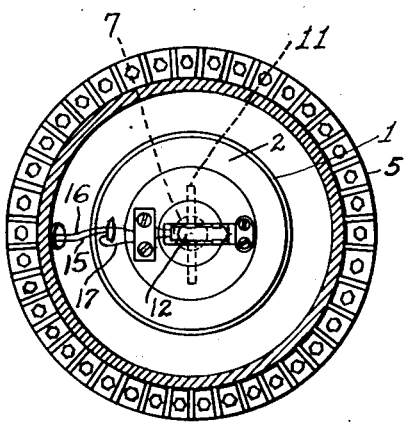
FIG-3-
INVENTOR
WALTER W. WILLIAMS
BY
Langdon Moore
ATTORNEY Patented Oct. 11, 1932

1,882,466

UNITED STATES PATENT OFFICE

WALTER W. WILLIAMS, OF BLOOMINGTON, ILLINOIS

ELECTRICALLY OPERATED MOTOR AND CONTROLLING MEANS THEREFOR

Application filed December 23, 1929. Serial No. 415,880.

This invention relates to improvements in electrically operated refrigeration devices and more particularly to an automatic control for a split phase motor for operating the mechanism thereof.

One type of an electrically operated refrigeration device employs a gaseous refrigerant which is reduced to liquid form by a compressor and condenser, in this form conducted to an evaporator in the cooling compartment of the ice-box or cabinet where it is allowed to return to a gas and in the gaseous form returns to the compressor. In this type of refrigerating device it may be desirable to return the gaseous refrigerant from the evaporator to a closed chamber containing both the compressor and the electric motor for operating it, as described in my prior copending application, Serial No. 406,234, filed November 11, 1929.

In a device of this character it may be desirable to employ a split phase motor which requires the breaking of the starting circuit after the motor circuit has been closed by the thermostat. In split phase motors it is customary to employ an open contact for this purpose and the resultant spark from such a make and break device upon a split phase motor enclosed in an atmosphere of a gaseous refrigerant would cause a chemical reaction or a breaking down of the gas. It is an object of this invention to provide a split phase motor with a control device for this purpose which will not affect the gaseous refrigerant and which will automatically break the starting circuit a predetermined time after the motor circuit has been closed and likewise, a predetermined time after the motor circuit has been broken, close the starting circuit preparatory to operating the motor again.

With this and other objects in view, reference is made to the accompanying drawing which illustrates a preferred form of this invention with the understanding that minor detail changes may be made without departing from the scope thereof.

In the drawing:

Figure 1 is a view partly in side elevation and partly in section of that element of an electrically operated refrigerating device including the compressor and compressor motor enclosed in the casing for receiving the gaseous refrigerant from the evaporator, illustrating the position of this improved control while the motor is at rest.

Figure 2 is a similar view, illustrating the position of the improved control while the motor is running.

Figure 3 is a fragmentary top plan view partly in section of Figure 1.

Figure 4 is a schematic wiring diagram of the starting circuit for the motor.

Since this invention relates only to the operating mechanism for receiving the gaseous refrigerant and compressing the same, this mechanism only is illustrated as any desired type of condenser and evaporator may be employed therewith. The electric motor 1 for operating the compressor is mounted within a casing 2 supported upon the compressor casing 3 which is supported within a base casing 4 to which is hermetically sealed a dome 5 which in turn encloses the motor casing and is in spaced apart relation thereto. The base casing 4 and dome 5 are mounted upon a suitable support 6.

The lower end of the driving shaft of the motor is operatively connected to the compressor mechanism within the casing 3 and the upper portion of the motor shaft 7 is extended through a bearing 8 on the top of the motor casing 2. This portion of the motor shaft is hollow, as shown, and mounts a reciprocable plunger 9 having a circumferential groove 10 adjacent its lower end. A plurality of vertical slots are formed in motor shaft above which are pivotally mounted a corresponding number of angular weighted arms 11 each having an extension adapted to enter the corresponding slot and engage within the circumferential groove 10 upon the plunger 9. The length of the plunger 9 is such that when the motor is at rest the upper end will project beyond the bearing 8 on the motor casing with exterior ends of the angular weighted arms 11 adjacent the motor shaft, as shown in Figure 1, and, when the motor is operating the weighted portions of the arms 11 will be carried away from the motor shaft by centrifugal force depressing the ends in engagement with the plunger 9 and retract it within the bearing 8, as shown in Figure 2.

A mercury tube switch 12, in which contact is made and broken between terminals entering one end of a sealed container by the movement of a contained body of mercury, is carried on a support 13 pivotally mounted at one end to the outer surface of the motor casing 2 surrounding the bearing 8 and extending in the path of the reciprocating plunger 9 so that when the plunger is extended the switch 12 will be rotated to the position shown in Figure 1 causing the mercury to flow into the end containing the terminals and close the circuit therethrough, and when the plunger 9 is retracted the switch will be rotated to the position shown in Figure 2 causing the mercury to flow to the end opposite the terminals and break the circuit therethrough. It is preferable to provide the free end of the pivoted switch support 13 with an extension adapted to engage a catch 14 upon the motor casing 2 to limit the upward rotation thereof.

The leads 15 and 16 from the source of electrical power enter through the base casing 4 and motor casing 2 to the respective windings of the motor 1, as shown in Figure 1. The mercury tube switch 12 is connected in series in the lead 15 by leads 17 with the starting winding 1ª of the motor. When the the motor is at rest, the mercury tube switch 12 is closed, as shown in Figure 1. When the thermostat closes the motor circuit the starting winding is energized to initiate operation of the motor and as the rate of rotation of the motor shaft increases the weighted arms 11 will retract the plunger 9 so that at normal rate of rotation the mercury tube switch 12 is opened, as shown in Figure 2, and the starting circuit is broken, likewise, when the motor circuit is broken by the thermostat the operation of the motor will cease and the plunger 9 will be extended as the weighted arms 11 assume their normal position as the motor stops, assisted by a spring interposed between the lower end of the plunger and solid portion of the motor shaft, if desired, so that the starting circuit will be closed through the mercury tube switch 12 preparatory for starting the motor when the thermostat again closes the motor circuit.

It is seen that by this construction and arrangement the starting circuit of a split phase motor is automatically broken and closed within an atmosphere of gaseous refrigerant without exposing the gas to the effects of an electric spark.

What I claim is:

In an electrically operated motor and controlling means therefor including a casing about said motor, a bearing for the free end of the motor shaft thereon, a tiltable mercury tube switch connected in series with the starting circuit of the motor mounted adjacent the free end of the motor shaft, means mounted on the motor shaft to tilt the switch to close the starting switch when the motor is idle, said means actuated by the rotation of said shaft when the motor is operating to open said switch and maintain it open during the operation of the motor, said means including a reciprocating plunger mounted within the free end of the motor shaft normally engaging and tilting the mercury tube switch to closed position, and pivotally mounted arms upon the motor shaft having ends passing through slots provided therefor in the walls of the shaft to be in engagement with said plunger and adapted upon the application of centrifugal force when the motor shaft is rotating to withdraw the plunger and allow the mercury tube switch to tilt to break the starting circuit.

WALTER W. WILLIAMS.